Aug. 29, 1961 W. KLAWITER 2,998,166

PUSH BUTTON SPREADER FOR SALT, PEPPER, SUGAR, ETC.

Filed Dec. 28, 1959

INVENTOR.
WERNER KLAWITER
BY
Carl Miller
ATTORNEY

United States Patent Office 2,998,166

Patented Aug. 29, 1961

1

2,998,166
PUSH BUTTON SPREADER FOR SALT, PEPPER, SUGAR, ETC.

Werner Klawiter, Escanaba, Mich.
(918 14th St., Greeley, Colo.)

Filed Dec. 28, 1959, Ser. No. 862,272
1 Claim. (Cl. 222—189)

This invention relates to dispensing apparatus and, more particularly, to a manually operated dispenser for various types of granular material.

Ordinarily, salt shakers, pepper shakers, and the like are used by the inverting the receptacle and shaking it so as to distribute such condiments onto the food. This is not only inconvenient, unhandy, and time consuming, but also makes proper distribution of the material more difficult. It is therefore an object of the present invention to provide a push button operated granular material dispenser which is extremely simple in construction, efficient in operation, and which will overcome the aforementioned difficulties.

Another object of the present invention is to provide a push button dispenser which can be conveniently used for spreading various types of granular material over any desired surface without having to first invert the receptacle thereof by a simple pushing and releasing manually actuated operation.

Still an additional object of the present invention is to provide a granular material dispenser of the type described which is novel to operate, completely sanitary, and which can be manufactured in large quantities at a relatively low cost.

All of the foregoing and still further objects and advantages of this invention will become apparent from a study of the following specification, taken in connection with the accompanying drawing, wherein.

Figures 1, 2, 3, 4:
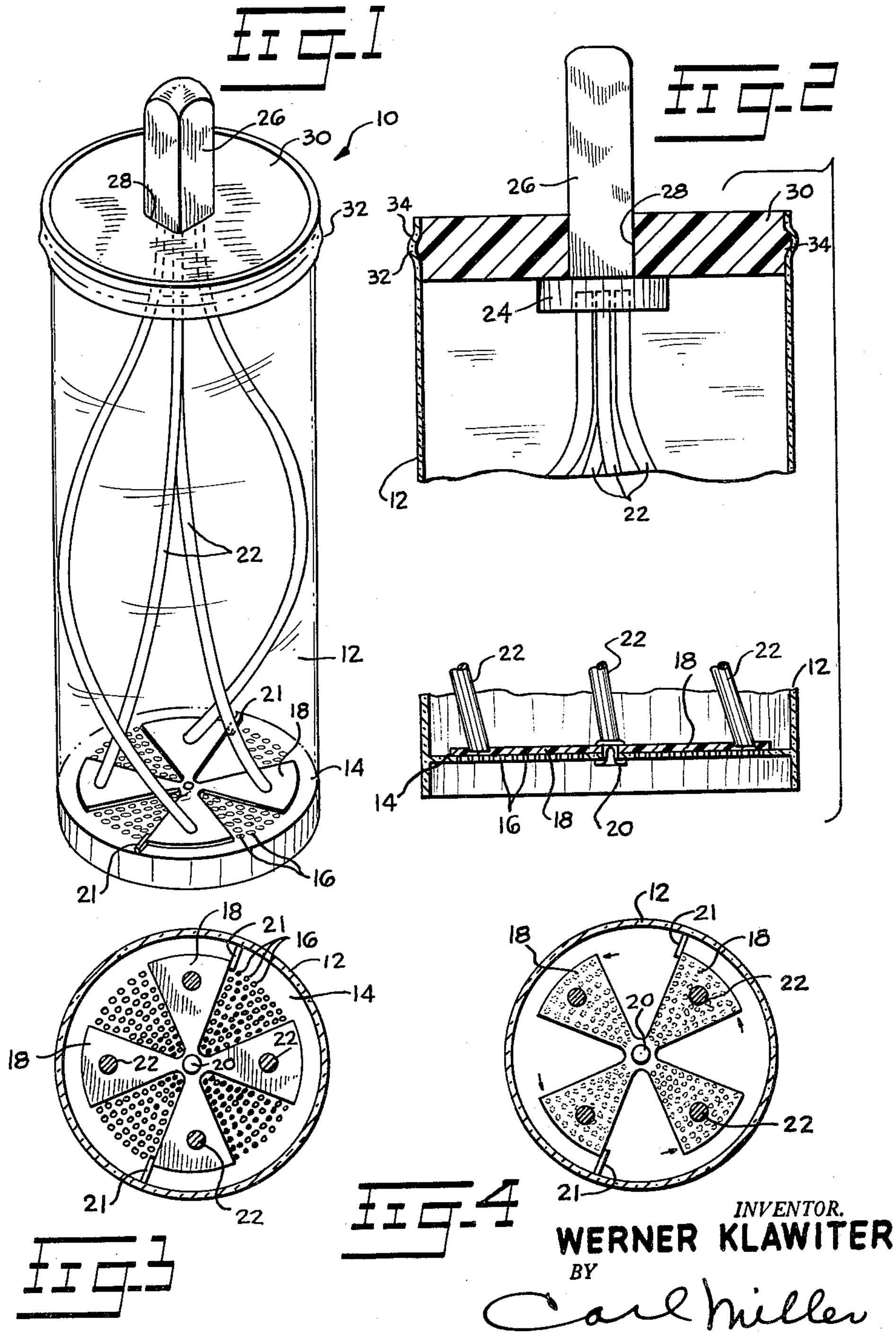
FIGURE 1 is a perspective view of a push button dispenser made in accordance with the present invention.
FIGURE 2 is an enlarged fragmentary cross sectional view of certain parts of the device shown in FIGURE 1.
FIGURE 3 is a transverse cross sectional view of the assembly shown in FIGURE 1.
FIGURE 4 is a view similar to FIGURE 3, with the parts in a normally closed position.

Referring now to the drawing, a push button type dispenser 10 made in accordance with the present invention is shown to include a main housing 12 of generally cylindrical shape and preferably having a transparent side wall for observing the interior of the housing that forms a storage compartment for receiving any desired granular material such as salt, pepper, sugar, and the like. The base wall 14 closes one lower end of the cylinder 12, which wall is provided with circumferentially spaced apart sectors of perforations 16 of proper size for accommodating the flow of the particular granular material outwardly therethrough.

A distribution plate in the form of a plurality of circumferentially spaced apart and radially extending sector elements 18 is rotatably supported by means of a pivot bearing 20 upon the base plate 14 for reciprocating rotational movement between a normally closed and an open position with the respective perforated sectors of the base wall 14. The size of each sector plate 18 is substantially equal in size to each sector of perforations 16 through the base wall 14, whereby the distribution plate in the normally closed position shown in FIGURE 4 effectively prevents the outward flow of granular material through the perforations 16. However, in response to rotation of the sector plate to the open position shown in FIGURE 3, granular material stored within the housing 12 is permitted to pass outwardly through the perforation 16 as will be hereinafter more fully described.

2

A pair of circumferentially spaced apart stops 21 carried by the base wall 14 serve to limit the reciprocating pivotal movement of the distribution plate between predetermined limits which define the aforementioned opened and closed positions.

A plurality of flexible, spring-like rods 22, each connected at one end to one of the distribution sector plates 18, is connected at its opposite end to a hub 24 of an actuating plunger 26. The plunger 26 is slidably received within a non-circular opening 28 in a closure member 30 which is removably secured within the open end of the housing 12 by means of detents 34 which are positioned within dimples 32 formed at the uppermost end of the housing 12. Thus, both the closure wall 30 and plunger 26 are secured against rotation relative to the housing 12. Accordingly, a downward movement upon the plunger 26 is operative to cause a similar downward movement of the flexible rods 22 which are longer than the distance between the hub 24 and the sector plates 18 and arched toward the direction of movement of the sector plates 18 from the normally closed position to the open position. As a result, a downward movement of the plunger 26 results in limited rotation of the sector plates 18 in the prescribed direction between the normally closed and open position; a release of the plunger 26 allows the spring-like rods 22 to return it to the normally raised position, at which time the sector plates 18 are also returned to the normally closed position by the flexing action of the rods 22.

It will now be recognized that movement of the sector plates 18 not only opens and closes the perforation 16, but also tends to distribute the granular material through all of the perforations while constantly dislodging any particles tending to cling to the interior surface of the base wall 14. This prevents clogging of the openings 16 and proper distribution of the granular material through the entire area of the base wall 14.

While this invention has been described with particular reference to the construction shown in the drawing, it is to be understood that such is not to be construed as imparting limitations upon the invention, which is best defined by the claim appended hereto.

Having thus described my invention, I claim as new and desire to secure by Letters Patent:

A granular material dispenser comprising, in combination, a main housing having a central granular material storage compartment, fluent granular material distribution means at one end of said housing, a manually engageable actuator carried by an opposite end of said housing, and motion transmitting means acting between said manually engageable actuator and said distribution means for dispensing granular material from said storage compartment to said distribution means, wherein said housing comprises a substantially hollow cylindrical unit having a side wall of generally transparent construction, a bottom wall at one end of said housing, and a removable closure wall at the opposite end of said housing, wherein said distribution means comprises a segmented circular plate defining a plurality of circumferentially spaced apart sectors, said bottom plate having circumferentially spaced apart perforated sectors of substantially the same size and shape as said sectors of said plate, said plate sectors being rotatable between a normally closed position overlying all of said perforated sectors and an adjusted open position providing communication between the interior of said housing and the exterior thereof through said perforated sectors, wherein said manually engageable actuator comprises a push button slidably carried by said removable closure for reciprocating longitudinal movement, and said motion transmitting means being connected between said push button and said segmented sector plate, and wherein said motion transmitting means comprises a plurality of flexible rods each connected at one end to one of said sectors of said distribution plates and the innermost end of said push button, and all of said flexible rods being normally arched in the direction of rotation of said sector plate from said normally closed to said open position.

References Cited in the file of this patent

UNITED STATES PATENTS 572,362 Loryea ---------------- Dec. 1, 1896
1,033,689 Fuchs ---------------- July 23, 1912